Figure 1:
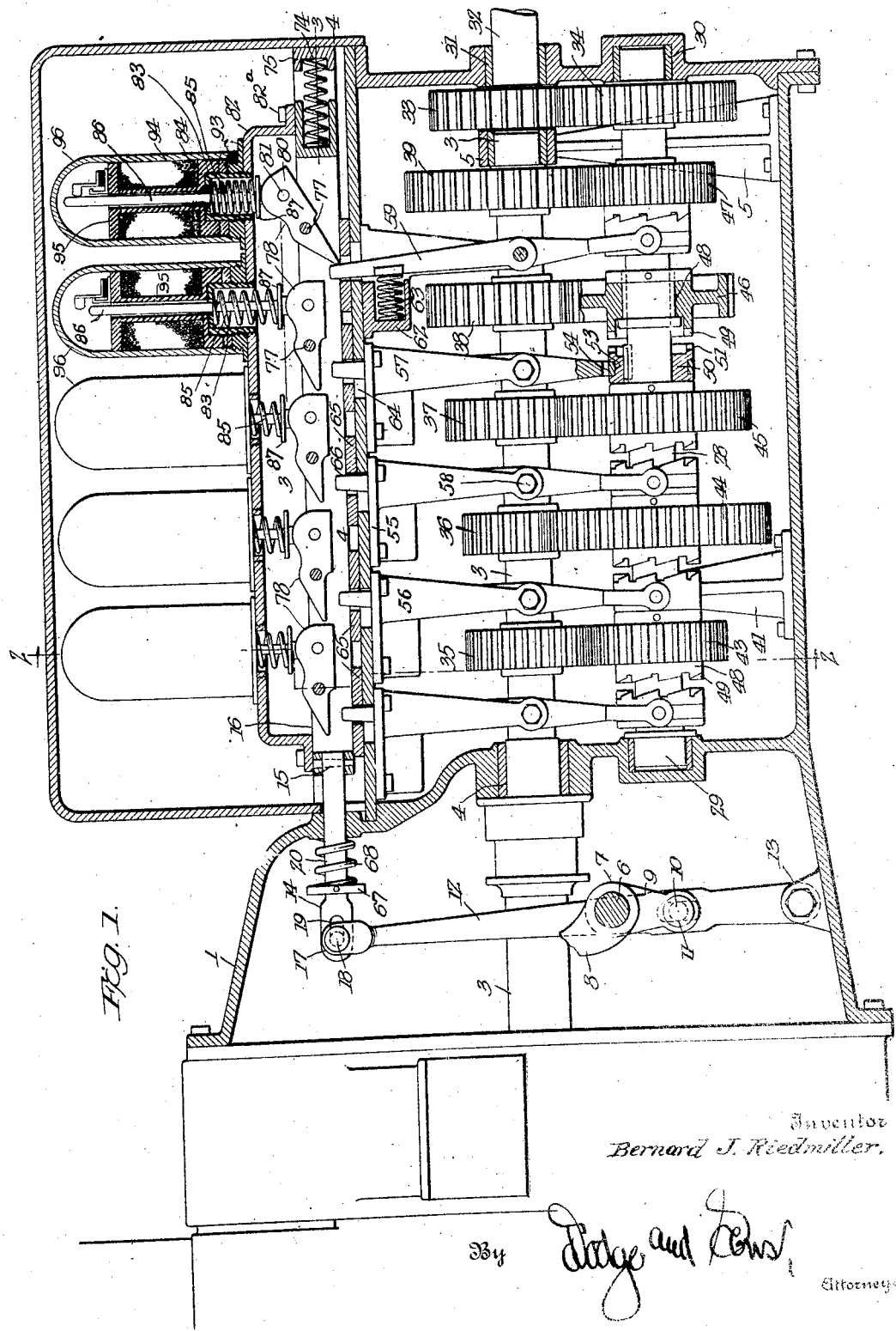

April 7, 1925.

B. J. RIEDMILLER 1,532,778

SPEED CHANGING TRANSMISSION

Filed July 24, 1923

4 Sheets-Sheet 1

Inventor
Bernard J. Riedmiller,

By

Attorneys

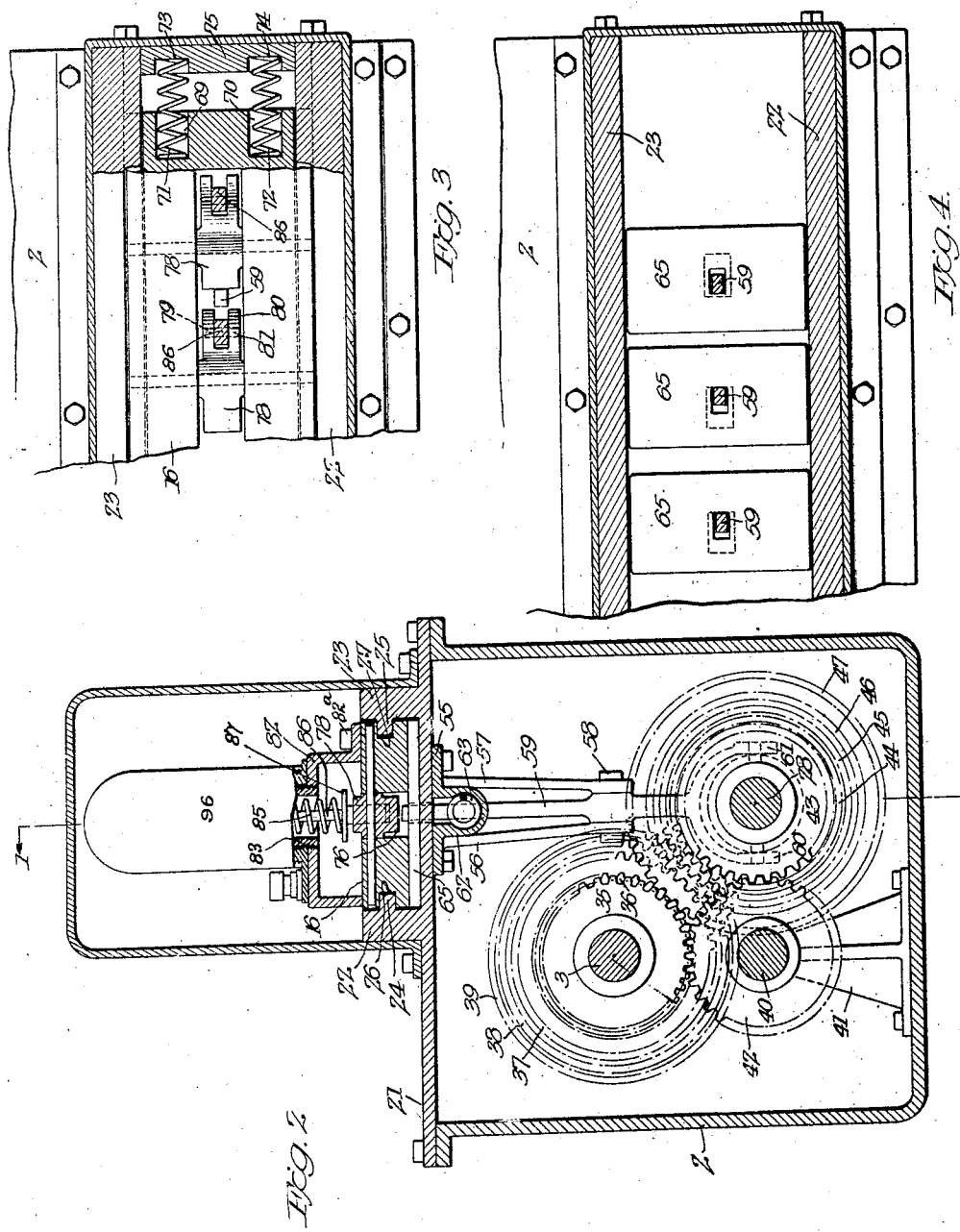

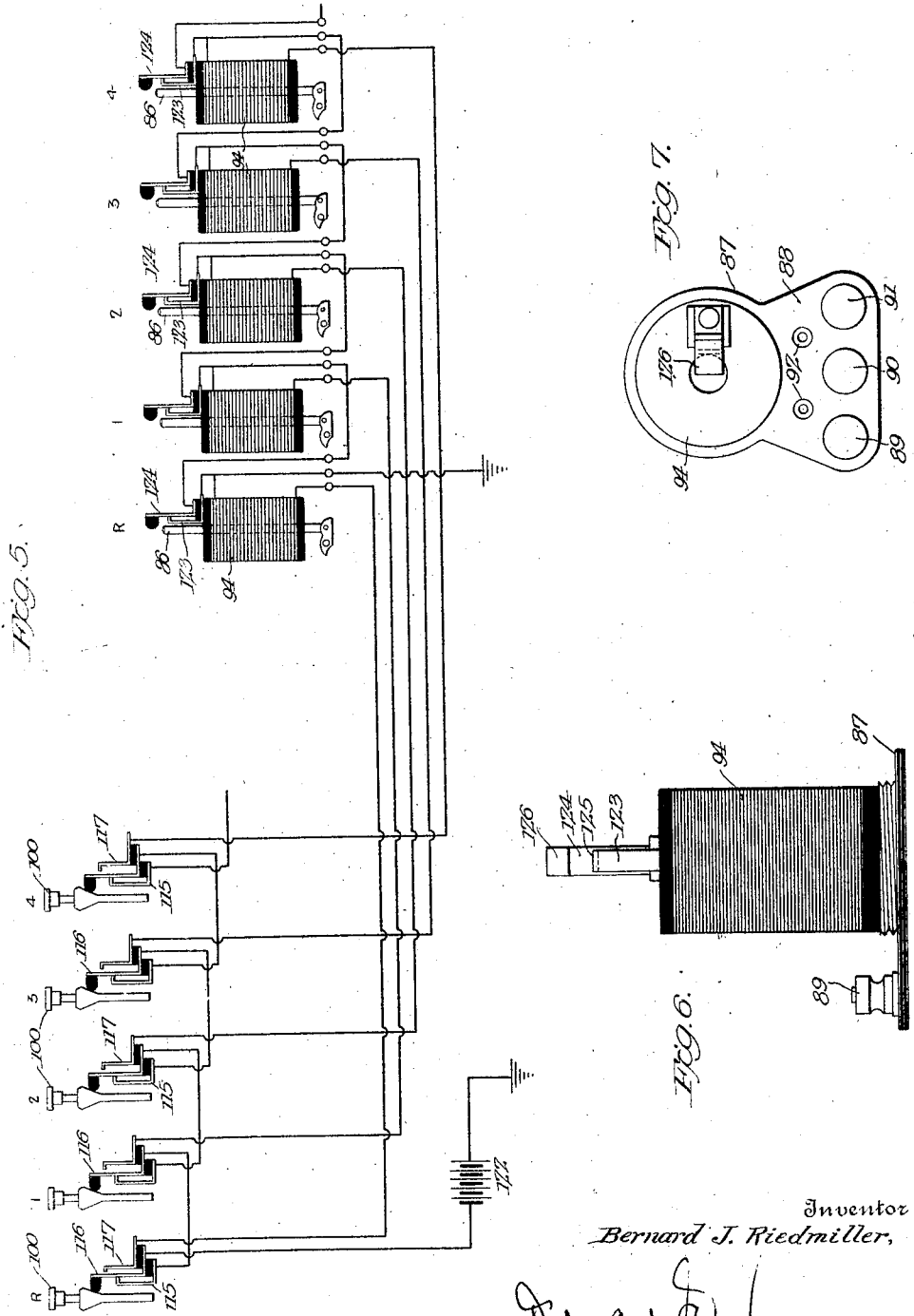

April 7, 1925.
B. J. RIEDMILLER
1,532,778
SPEED CHANGING TRANSMISSION
Filed July 24, 1923
4 Sheets-Sheet 4
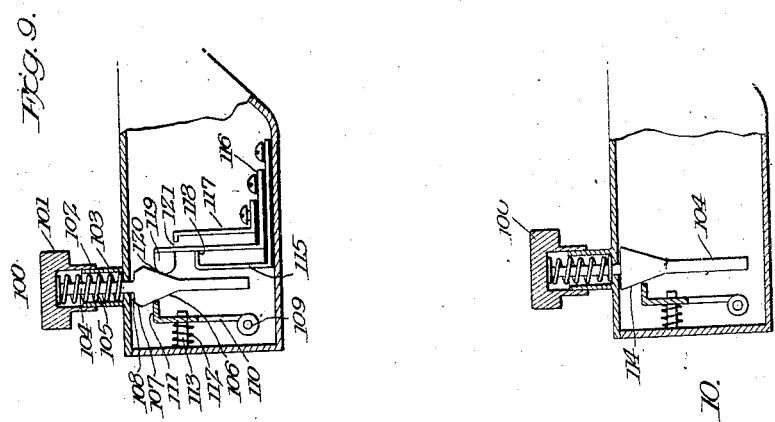
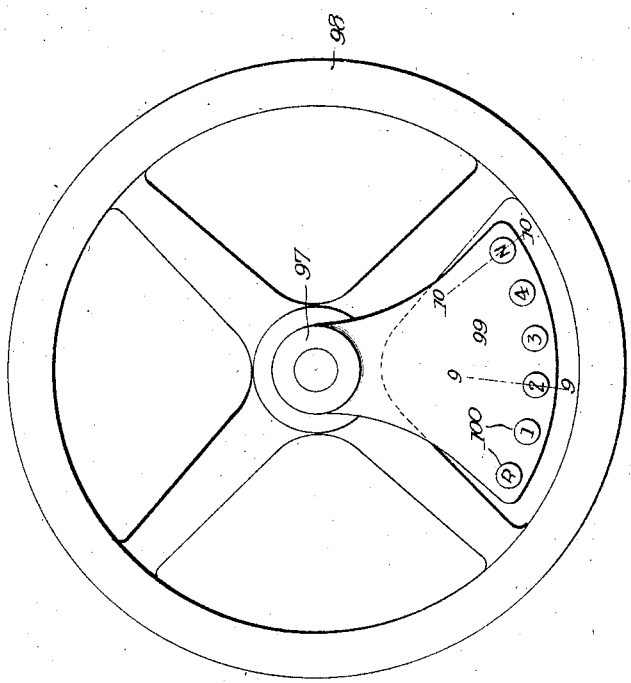
Inventor
Bernard J. Riedmiller,
By
Attorneys Patented Apr. 7, 1925.

1,532,778

UNITED STATES PATENT OFFICE.

BERNARD J. RIEDMILLER, OF SCRANTON, PENNSYLVANIA.

SPEED-CHANGING TRANSMISSION.

Application filed July 24, 1923. Serial No. 653,535.

*To all whom it may concern:*

Be it known that I, BERNARD J. RIEDMILLER, a citizen of the United States, residing at Scranton, in the county of Lackawanna and State of Pennsylvania, have invented certain new and useful Improvements in Speed-Changing Transmission, of which the following is a specification.

The present invention pertains in general to power transmission devices, and particularly to electrically-controlled and operated speed selecting mechanism in combination with change-speed and reversing gear sets of the constant mesh type intended for use in automobiles and motor cars.

It is the primary object of the invention to provide a variable speed and reversing gear, in combination with a driving shaft and a driven part, with electrical means for effecting the desired change in speed or direction of drive. The invention further includes the provision of an efficient and reliable system of control adapted, upon the simple manipulation of the selecting mechanism, to shift or cause to be shifted quickly and positively the elements necessary to bring about the desired changes.

The particular advantages of this transmission are the doing away with the usual hand-operated gear shift lever and the absence of any manually operated, mechanical means other than the clutch pedal and the electrical controller, thus allowing the operator to give a maximum of attention to steering; the saving of fuel due to the higher speed at which the automobile can be kept running; the absence of sliding gears and their accompanying clashing, and the possibility of their being stripped during the shifting operations; the greater simplicity of the change-speed operations, and the rapidity with which such changes may be made.

A most important feature of the electrical speed selecting means used in the present transmission, the electrical energy for which is ordinarily furnished by the automobile storage battery, although a separate battery may be used, is the extreme lightness and the small number of electrically-operated parts required, thereby necessitating the use at all times of but a minimum of electrical energy. It is well known that the principal objection to electrically-operated devices of this character is the drain which they cause on the electrical energy of the automobile storage battery due to the weight of the electrically-operated parts used and the comparatively heavy work which they are called upon to perform. Naturally this results in a lessening of the efficiency of the battery for performing its normal functions in connection with the ignition, lighting and starting systems of the automobile.

A further advantage of the present transmission is the accessibility of those electrically-operated parts which are most likely to get out of order. Certain of the electrical parts are constructed and arranged in the transmission so that they may be removed or replaced as units without materially disturbing the adjoining parts, thus reducing considerably the time and expense incident to the maintenance and repair of transmissions of this type.

A further object is to so construct and arrange the transmission that it is impossible for the operator to throw into operation more than a single speed driving mechanism at one and the same time.

A still further object is to provide an electrically controlled transmission wherein a continuous drain on the electrical energy of the battery is not necessary, but rather the energy from the battery is utilized only when changing from one speed to another; also to provide an electrically controlled system wherein the desired speed changing switch or push button may be operated at any time and still permit the proper functioning of all parts in the system.

Other objects and advantages of the invention will be apparent from the detailed description hereinafter given of the construction and operation of the same, and the accompanying drawings, illustrating a preferred embodiment thereof.

In the drawings, wherein the same reference numerals indicate like parts throughout the several views, Figure 1 is a sectional view of my improved transmission taken on line 1—1 of Fig. 2, the automobile clutch and certain allied parts being shown in side elevation, and all of the parts in the positions which they assume when the transmission is operating in "high";

Fig. 2, a sectional view of the transmission taken on line 2—2 of Fig. 1, looking in the direction of the arrows;

Fig. 3, a horizontal sectional view taken on line 3—3 of Fig. 1, looking downwardly, and showing the interior construction of the mechanism at this point;

Fig. 4, a horizontal sectional view taken on line 4—4 of Fig. 1, looking downwardly, and showing the plates which cooperate with the shifter levers and the openings in the gear casing through which the latter project, to prevent the egress of oil and the ingress of dust;

Fig. 5, a diagrammatic view of the electrical speed selecting and controlling system used in the transmission;

Fig. 6, a front elevation of one of the solenoids used in the electrical speed-control mechanism showing the fibre base thereof with the attached binding posts;

Fig. 7, a plan view of the same;

Fig. 8, a plan view of an automobile steering wheel with the speed selecting means mounted on the steering column thereof;

Fig. 9, a sectional view taken on line 9—9 of Fig. 8, looking towards the right, and showing the detailed construction of one of the speed selecting push-buttons, and the mechanism associated immediately therewith; and Fig. 10, a similar view taken on line 10—10 of Fig. 8, looking towards the right and showing the detailed construction of the "neutral" push-button.

In the drawings, 1 represents the clutch housing and 2 the transmission-gear housing. The clutch-shaft 3 extends through the front wall of the gear-housing 2 in which it has a bearing 4 and terminates at the rear end of the gear housing in the upper end of a bearing-supporting member 5 secured to the bottom of housing 2.

The operating-shaft for the clutch (not shown) which is actuated by the clutch pedal (not shown) is disclosed at 6 (Fig. 1). Secured rigidly on shaft 6 is an angle lever 7 having an upper arm 8 and a lower arm 9. In the lower end of arm 9 there is provided a pin 10 which engages with an upright slot 11 in a lever 12 which latter is pivotally connected at 13 to the bottom of clutch-housing 1. With this arrangement, when the clutch pedal is depressed to disengage the automobile clutch, shaft 6 will rotate in a counter-clockwise direction and in a clockwise direction when the clutch is engaged, thus first causing a movement to the right, away from the clutch (Fig. 2), and then to the left, towards the clutch of the upper end of lever 12.

Lever 12 is pivotally connected at its upper end to the front end of a horizontal member 14 which is rigidly and detachably secured at 15 to the forward portion of shifter plate or bar 16, carrying certain of the speed-controlling mechanism to be described later. As shown in Fig. 1, the pivotal connection mentioned is formed by providing lever 12 with an upper forked end 17, the arms of which carry a cross-pin 18.

This pin also extends through a horizontal slot 19 in the forward end of member 14 which latter extends between the arms of the forked end 17 of lever 12.

At 20 in the upper rear wall of clutch housing 1, there is provided a bearing in which member 14 may reciprocate upon the forward or backward movement of the upper end of lever 12. Shifter bar 16, which is rectangular in shape, is also mounted for reciprocation on the top of cover 21 which is suitably bolted to and closes the upper side of gear housing 2. For this purpose, the upper face of cover 21 has arranged thereon a pair of longitudinaly disposed parallel guides 22, 23 (Fig. 2) on the inner faces of which are tongues 24, 25. Corresponding grooves 26, 27 of the sides of plate or shifter bar 16 engage with these tongues and together serve to guide shifter bar 16 in its reciprocatory movements upon the actuation of lever 12, caused by the engaging or disengaging movements of the clutch pedal.

Referring now to the mechanism in gear box or housing 2. there is shown at 28 the counter or jack-shaft which is adapted to be driven by clutch-shaft 3 at different speeds through the gear sets on the two shafts. Bearings 29 and 30 are provided in the front and rear walls of gear housing 2 for the ends of jack-shaft 28. Another bearing 31 in the rear wall of gear box 2 supports the front end of the automobile propeller shaft 32 which projects a short distance into box 2 and on which is rigidly mounted a gear 33 to rotate therewith. Rigidly mounted on the rear end of jack-shaft 28 and meshing with gear 33 to drive the same and the propeller shaft 32 is another gear 34.

Mounted on clutch-shaft 3 and keyed thereto are the driven gears 35, 36, 37, 38 and 39 for "reverse" and "first", "second", "third", and "fourth" speeds, respectively. In the gear housing 2 below clutch-shaft 3 is a shaft 40 (Fig. 2) having its front end journalled in the front wall of gear housing 2 (not shown) and its rear end in the upper end of a journal-supporting member 41 secured to the bottom of the housing. Shaft 40 has loosely mounted thereon an intermediate gear 42 which meshes with "reverse" gear 35. Loosely mounted on jack-shaft 28 towards its front end is another "reverse" gear 43 which is constantly in mesh with intermediate gear 42. This arrangement, as is well understood causes gear 43 to be driven in a clockwise direction on jack-shaft 28 upon the similar rotation of "reverse" driver gear 35.

Loosely mounted at intervals on jack-shaft 28, are the driven gears 44, 45, 46 and 47, these gears being always in mesh with and adapted to be driven respectively by driver gears 36, 37, 38 and 39 in a counter-clockwise direction upon rotation of the latter. Hence, upon rotation of clutch-shaft 3, gears 44, 45, 46 and 47 will all rotate constantly in a counter-clockwise direction on jack-shaft 28 and reverse gear 43 constantly in a clockwise direction. Each of the driven gears 43, 44, 45, 46 and 47 (Fig. 1) is formed on its left face with a central annular boss or projection 48 having a series of teeth 49, thus providing a clutch member by means of which the selected gear may drive jack-shaft 28 as will appear hereinafter.

The mechanism for coupling the selected gear on jack-shaft 28 to drive the jack-shaft and the means for operating said coupling mechanism will now be described. It will be necessary to go into a detailed description of only one of these mechanisms and its operating means, that associated with "third" speed gear, since they are all identical.

Adjacent and on the left side of each driven gear, in this case gear 46, on jack-shaft 28 is mounted an annular clutch member 50 having a series of teeth 51, corresponding to and adapted to engage teeth 49 on the side of gear 46. Clutch member 50 is keyed at 52 to jack-shaft 28 so that it will rotate therewith and at the same time is capable of being shifted thereon a short distance longitudinally to cause its teeth to engage with or disengage from the teeth 49 on the side of gear 46. Clutch member 50 is provided on its circumference with an annular groove 53 in which a ring 54 is loosely mounted, so that clutch member 50 may rotate freely within the same.

Secured to the lower face of cover 21 of gear box 2 is a plate 55 having a pair of depending arms 56, 57 in the lower ends of which is mounted a cross-pin 58. Mounted for oscillation intermediate its ends on this pin is an upright shifter lever 59. The lower end of shifter lever 59 is forked to provide a pair of curved arms 60, 61 which partially embrace clutch member 50. The lower ends of arms 60, 61, as shown in Fig. 2, are pivotally connected in any suitable manner to ring 54 of clutch member 50 at diametrically-opposite points in a horizontal plane.

In this construction, as shown in Fig. 1, clutch teeth 49 and 51 will be out of engagement when shifter lever 59 is in a substantially vertical position, whereas the teeth will engage with each other upon the oscillation of the upper end of shifter lever 59 to the left, this latter position of the parts being shown in the "fourth" or "high" gear. Each plate 55 has thereon a box 62 carrying one end of a coil spring 63, the outer end of which presses against the upper end of shifter lever 59 so as to continuously urge the same towards the rear and thereby normally maintain the corresponding clutch member 50 in its "out" or unengaged position.

The upper end of each shifter lever 59 is extended so as to project freely through a slot 64 provided therefor in cover 21 of gear box 2. These slots are of just sufficient length to permit the necessary oscillation of shifter levers 59 when operated by means hereinafter described. Means are also provided in connection with these slots to prevent the escape of splashing oil from gear housing 2 and also the possible entrance of dirt into the housing. For this purpose each shifter lever 59 has a short plate 65 located loosely beneath shifter bar 16 on cover 21 between and guided by guides 22, 23. Each plate 65 is provided with an opening 66 therein through which the upper end of shifter lever 59 extends with a snug fit. Thus, it will be seen that, since plates 65 slide back and forth with the movements of the upper ends of shifter levers 59, slots 64, in cover 21, are always closed against the escape of oil or entrance of dirt. Plates 65 are made of such length that they will not interfere with the operation of each other.

In order to aid in the return of shifter plate or bar 16 to its normal forward position after the automobile clutch pedal has been depressed to let out the clutch and thereby move shifter bar 16 rearwardly on gear box cover 21, as hereinbefore described, member 14 connected to the front end of shifter bar 16 is provided with a fixed collar 67 near its outer end, between which and the rear wall of clutch housing 1 is disposed on the member 14 a coil spring 68. At its rear end shifter bar 16 has therein a pair of recesses 69, 70 which receive the forward ends of a pair of coil springs 71, 72, respectively. The rear ends of these springs are disposed in a corresponding pair of recesses 73, 74 provided therefor in the detachable cross-bar 75 which is secured to the upper face and at the rear edge of gear box cover 21. The three springs 68, 71 and 72 thus serve to constantly urge shifter bar 16 forward or towards the clutch-housing 1.

Shifter bar 16 has a longitudinal slot 76 extending almost to each end thereof into which the upper ends of shifter levers 59 project a short distance. Pivotally mounted at their forward ends on removable pins 77, which are supported in shifter bar 16 and extend across the upper portion of slot 76 is a series of catches or pawls 78, one for each shifter lever 59. Each pawl 78 is slotted at its rear end to provide a pair of rearwardly extending arms 79, 80 in which is secured a cross-pin 81 by means of which the pawl is connected to its operating mechanism described later.

On the top of shifter bar 16 there is secured a brass cover 82 by means of screws or bolts 82ª. This cover, which moves with the shifter bar 16 serves not only to enclose the pawls 78 and the mechanism associated therewith, but also carries the electrical mechanism for operating the pawls.

This electrical mechanism, in the case of each pawl 78, comprises a brass open-ended tubular member 83 threaded at its lower end and secured vertically in an opening provided therefor in cover 82, directly above the rear end of pawl 78. The upper portion of member 83 is of reduced diameter so as to provide an interior shoulder 84 therein against which seats the upper end of a light coil spring 85. Extending through member 83 so as to project somewhat above and below it, is a solenoid core member 86. The lower extremity of core member 86 is flattened and perforated transversely so as to extend between arms 79, 80 of pawl 78 and receive cross-pin 81 whereby it is pivotally connected to the rear end of the pawl. On the lower end of core member 86, just above its connection with pawl 78, there is an annular flange 87 which serves as a seat for the lower end of coil spring 85. The function of coil spring 85, as will be readily seen, is to urge the rear end of pawl 78 downwardly so as to maintain the pawl in its normal horizontal position as shown to the left in Fig. 1.

Mounted on each member 83 and removably secured at its base to cover 82 is a solenoid (see Figs. 6 and 7). This solenoid comprises a fibre base 87 having an opening therein so that it will fit over member 83 and rest on cover 82. Base 87 is provided at one side with an extension 88 along the outer edge of which are mounted three binding posts 89, 90 and 91 for the necessary electrical connections hereinafter described. Holes 92 in base 87 are for securing the solenoid with screws or the like to cover 82. Fitting snugly around the lower part of member 83 and resting on base 87 of the solenoid is an annular brass member 93 which is screw-threaded exteriorly. The solenoid coil is shown at 94 and the spool on which it is wound at 95, the latter having a central opening therethrough so as to fit over tubular member 83. Annular member 93 is of slightly larger diameter than the solenoid coil so that it may receive the lower interiorly-threaded end of metal cap 96 which encloses the coil and its parts.

From the above description, it will be seen that upon the energization of any one of the solenoids, the core member 86 thereof will be elevated into tubular member 83, against the slight resistance of spring 85, resulting in a pivotal movement of the corresponding pawl 78 about its pin 81 and causing the broad front tapered end of the pawl to tip downwardly towards the upper face of plate 65 on cover 21 of the gear housing. Assuming that all of the gears are in "neutral," i. e., all of the shifter levers 59 are in vertical position and their clutches "out," when a selected solenoid is energized, say that for the "fourth" or "high" speed gear, the extreme right-hand gear set in Fig. 1, the forward end of the corresponding pawl 78 is tipped downwardly, and as the automobile clutch is thrown "out," moving shifter bar 16 rearwardly, or to the right, (Fig. 1) together with the pawls 78 and their solenoids so as to carry the left-hand or tapered ends of pawls 78 beyond the upper projecting ends of shifter levers 59, the left end of the pawl 78 which has been tipped will move down behind and engage the right side of its corresponding shifter lever 59, where it will remain until its solenoid is de-energized. Since only one of the solenoids is energized at a time, all except the corresponding pawl 78 will remain in horizontal or normal position. Consequently, upon the release of the automobile clutch and the resulting forward or left-hand movement of shifter bar 16 the pawls 78 will pass over the projecting ends of shifter levers 59 except the extreme right-hand pawl 78, (Fig. 1) which latter, being in engagement with the upper end of its shifter lever 59, will swing the same to its inclined position causing the corresponding gear set clutch to be thrown in and thereby place the transmission in "high."

In Figs. 8, 9 and 10, there is shown the speed selecting mechanism which is secured in any suitable manner to the steering wheel column 97 of the automobile steering wheel 98, so as to be within convenient reach of the operator. The mechanism is enclosed in a segmental box or casing 99, around the outer edge of which are arranged push buttons 100, corresponding to the four speeds, or more, if desired, "reverse" and "neutral." These are marked "1," "2," "3," "4," "R" and "N," respectively. Each push button 100, as shown in Fig. 9, comprises a cap 101 having a short depending annular flange 102 on its underside which telescopes over a corresponding but longer upstanding annular flange 103 provided on box 99. Secured at its upper end to cap 101 within flange 102 is a cam rod 104, the lower portion of which projects into box 99 through an opening provided therefor inside of annular flange 103. Between cap 101 and box 99, within the telescoping parts is a coil spring 105 adapted to maintain cap 101 in its upper or normal position. Cam rod 104, as shown in Fig. 9, is provided on its left side with an outwardly and upwardly inclined portion 106, and adjoining and above that with an upwardly and inwardly inclined portion 107 ending in a shoulder 108.

Within box 99 near its outer edge there is pivotally mounted at 109 a horizontal plate 110 having an outstanding flange 111 on the upper edge thereof. Plate 110 and its flange 111 are of sufficient length to extend beside and permit flange 111 to engage with the inclined portions 106 of all of the push buttons 100 against which it is continuously urged by coil springs 112 mounted on pins 113, in the side of box 99 and projecting freely through suitable openings in plate 110.

The "neutral" push button 100 is of the same construction as the others except that, as shown in Fig. 10, its cam rod 104 is provided with only a single upwardly and outwardly inclined portion 114 which is equal in height to that of both of the inclined portions 106 and 107 of the other push buttons together.

In box 99 to the right of each push button 100, except in the case of the neutral push button just described, there is provided a series of three electrical contact-springs 115, 116 and 117 secured to the bottom of box 99 and suitably insulated at this point from the box and each other. The contact portions of springs 116 and 117 are normally separated from each other while those of springs 115 and 116 are normally in contact at 118. The upper extremity of contact spring 116 is provided with a fibre piece 119 which at all times engages with an inclined portion 120 provided on the right-hand side of each cam rod 104, except that of the "neutral" push button, and corresponding to inclined portion 106 on the opposite side thereof.

With the selecting mechanism construction described, when a push button 100, other than the "neutral" button, is depressed, its inclined portion 120 will cam the vertical portion of contact spring 116 to the right and break its contact at 118 with contact spring 115 and cause spring 116 to contact with spring 117 at 121. The selected push button 100 is held in its depressed position in order to maintain contact between springs 116 and 117 by means of plate 110. As push button 100 is depressed flange 111 of plate 110 rides on inclined portion 106, swinging plate 110 about its pivot 109, then rides on inclined portion 107 and finally, due to the presence of springs 112, engages with shoulder 108, thereby latching the push button in its depressed position.

When it is desired to "clear" the selected mechanism or set it in "neutral," the push button "N" is depressed, whereupon inclined portion 114 on its cam rod 104 moves downwardly camming plate 110 to the left and thereby releasing any other push button 100 which may have been latched in its depressed or operating position, the latter then being returned to normal position by its spring 105. At the same time the corresponding contact spring 116 will break its contact with spring 117, and re-establish its contact with spring 115, in readiness for future operations.

Referring further to the solenoids for operating pawls 78, there is provided on the top of each a pair of contact springs 123, 124 secured thereto and suitably insulated from the solenoid and each other (for details see Figs. 6 and 7). Contact springs 123, 124 are normally in contact at 125. The upper extremity of spring 124 has a fibre piece 126 secured thereto and having a rounded outer face. The upper extremity of core member 86 of each of the solenoids is also rounded so that upon the upward movement of the core member upon the energization of its solenoid, the end of the core member will engage with the fibre piece 126, and cam the upper end of spring 124 to the right (Fig. 1), and thus break its contact with spring 123 at 125. The purpose of this "cut-out" on each solenoid, as will appear more clearly later, is to disconnect the ground contacts of all except the solenoid in use, or to render impossible the energization of more than one of the solenoids at a time.

Figure 5 is a diagrammatic representation of the electrical circuits between the solenoids, which operate pawls 78, and the "cut-outs" associated therewith, contact springs 115, 116, 117 for each push button 100 and the storage battery 122 by which the necessary electrical energy is supplied. As stated, this may be the automobile battery or a separate battery as desired.

Battery 122 is grounded at one side and the other side is connected to contact spring 116 of reverse push button 100. Contact spring 115 of this same push button is connected to contact spring 116 of the first-speed push button 100, and the same contact springs of the remaining push buttons 100 are connected in like manner. The contact spring 115 of the last push button 100, that for the fourth speed, may be connected in the same manner to additional push buttons 100 if the transmission is provided with more than four speed gear sets. The contact spring 117 of reverse push button 100 is connected to binding post 89 of the reverse gear solenoid, this binding post in turn being connected to one end of the coil winding of the solenoid. Contact spring 123 of the reverse gear solenoid is connected to its binding post 90, which binding post in turn is connected to a ground wire. The other end of the coil winding of the reverse gear solenoid is connected to the wire extending between contact spring 123 and binding post 90. Contact spring 124 of the reverse gear solenoid is connected to binding post 91 thereof, the binding post in turn being connected to the binding post 90 of the first speed solenoid. The remaining solenoids are connected together in the same manner as described with reference to the reverse gear and first speed solenoids, and at their binding posts 89 to the contact spring 117 associated with the corresponding push button 100, as will appear clearly upon reference to Fig. 5. Binding post 91 of the fourth speed solenoid may be connected in like manner to any additional solenoids which might be used and to the added push buttons 100.

In operation, assuming that all of the parts are in their normal positions, that is, in "neutral," and it is desired to connect the transmission so that it will drive in "high" or fourth speed, the automobile clutch pedal is depressed by the operator, resulting in the disengagement of the automobile clutch and a rearward sliding movement of a shifter bar 16, at the end of which rearward movement the front ends of pawls 78 are located slightly to the right (Fig. 1) of the upper extremities of shifter levers 59. Push button "4" is then depressed, thereby energizing the corresponding solenoid which, as heretofore explained, results in the fourth speed pawl 78 being tipped down at its front end, so that as the automobile clutch is let in and shifter bar 16 moves towards its normal forward position, the fourth speed pawl 78 will engage the upper extremity of its gear clutch shifter lever 59 and cause its gear clutch to become engaged, as will be readily understood from the description hereinbefore given. The operation described will cause clutch shaft 3, which is the driving member, to drive the propeller shaft 22 through gears 39, 47, 34 and 33. The operation of the mechanism and the manner of selecting the desired speed at which it is desired to drive shaft 32 is the same as regards the several other forward drives and also the reverse drive.

It is hereinbefore explained how the transmission and its selecting and controlling mechanism is connected so as to render it impossible for more than one of the solenoids to be energized at the same time, in the absence of which more than one gear-clutch might be thrown into engagement at the same time and thus result in material damage to the mechanism. It has also been explained how after the transmission has been connected so that it is driving in a desired speed, the "neutral" push button 100 may be depressed so as to prevent any continuous drain on the storage battery 122.

What I claim is:

1. In a device of the character described, the combination with a shaft-clutch actuating member, and a constant-mesh gear set including a series of gear-clutches operating in connection with certain of the gears of said set, of a bar shiftable forwardly and rearwardly by said shaft-clutch actuating member, actuating means carried by said bar to shift the several gear-clutches into engagement upon the forward movement of said bar, means for normally holding said gear-clutches in disengaged position, means for bringing a selected gear-clutch actuating means into operative position, and automatic means tending to return said selected gear-clutch actuating means to its normal inoperative position upon rearward movement of the reciprocable member.

2. In a device of the character described, the combination with a shaft-clutch actuating member, and a constant-mesh gear set including a series of gear-clutches operating in connection with certain of the gears of said set, of a bar shiftable forwardly and rearwardly by said shaft-clutch actuating member, actuating means carried by said bar to shift the several gear-clutches into engagement upon the forward movement of said bar, means yieldable against the action of said actuating means for normally holding said gear-clutches in disengaged position, and means by which only one of said gear-clutch actuating means may be brought into operative position at a time.

3. The combination in a device of the character described, of driving and driven elements, a constant-mesh gear set for varying the speed of or for reversing the driven element, a series of gear-clutches operating in connection with certain of the gears of said set, means for normally holding said gear-clutches in disengaged position, a shaft-clutch actuating member, a member mounted for reciprocation forwardly and rearwardly by said shaft-clutch actuating member, actuating means carried by said reciprocable member to shift the several gear-clutches into engagement upon the forward movement of the reciprocable member, and electrical means for bringing a selected gear-clutch actuating means into operative position.

4. The combination in a device of the character described, of driving and driven elements, a constant-mesh gear set for varying the speed of or for reversing the driven element, a series of gear-clutches operating in connection with certain of the gears of said set, means for normally holding said gear-clutches in disengaged position, a shaft-clutch actuating member, a member mounted for reciprocation forwardly and rearwardly by said shaft-clutch actuating member, actuating means carried by said reciprocable member to shift the several gear-clutches into engagement upon the forward movement of the reciprocable member, and electrical means for moving a selected gear-clutch actuating means into operative position, said electrical means being arranged so as to prevent more than one gear-clutch actuating means moving into operative position at a time.

5. The combination in a device of the character described, of driving and driven elements, a constant-mesh gear set for varying the speed of or for reversing the driven element, a series of gear-clutches operating in connection with certain of the gears of said set, means for normally holding said gear-clutches in disengaged position, a shaft-clutch actuating member, a member mounted for reciprocation forwardly and rearwardly by said shaft-clutch actuating member, actuating means carried by said reciprocable member to shift the several gear-clutches into engagement upon the forward movement of the reciprocable member, independent electrically operated actuating means for each of said gear-clutches carried by said reciprocable member to move the actuating means for the several gear-clutches into operative position, electrical means for operating a selected gear-clutch actuating means to bring it into operative position, and means for breaking the electrical connection between said selected electrical means and the selected gear-clutch actuating means after said gear-clutch is in engaged position.

6. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging said shifter bar towards its normal forward position, actuating means carried by said bar to shift the several gear-clutches into engagement upon the forward movement of said bar, means yieldable against the action of said actuating means, for normally maintaining said gear-clutches in disengaged position, and electrical means for bringing a selected gear-clutch actuating means into operative position.

7. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging said shifter bar towards its normal forward position, a series of clutch actuating pawls, corresponding to said gear-clutches, pivotally mounted on said shifter bar, means for holding said pawls in inoperative position, and electrical means for moving a selected pawl into operative position to cause engagement of the corresponding gear-clutch upon the forward movement of the shifter bar.

8. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging the shifter bar towards its normal forward position, a series of clutch-actuating pawls corresponding to said gear-clutches, pivotally mounted on said shifter bar, means for holding said pawls in inoperative position, and individual solenoids for each of said pawls located on said shifter bar, by means of which a selected pawl may be caused to move into operative position to bring about the engagement of the corresponding gear-clutch upon the forward movement of the shifter bar.

9. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging the shifter bar towards its normal forward position, a series of clutch-actuating pawls corresponding to said gear-clutches, pivotally mounted on said shifter-bar, means for holding said pawls in inoperative position, individual solenoids for each of said pawls located on said shifter bar, and electrical selecting means for energizing any one of said solenoids to cause the corresponding pawl to move into operative position.

10. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging the shifter bar towards its normal forward position, a series of clutch-actuating pawls corresponding to said gear-clutches, pivotally mounted on said shifter bar, means for holding said pawls in inoperative position, individual solenoids for each of said pawls located on said shifter bar, electrical selecting means for energizing any one of said solenoids to move the corresponding pawl into operative position, and means whereby only one of said solenoids may be energized at a time.

11. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging the shifter bar towards its normal forward position, a series of clutch-actuating pawls corresponding to said gear-clutches, pivotally mounted on said shifter bar, means for holding said pawls in inoperative position, individual solenoids for each of said pawls located on said shifter bar, electrical selecting means for energizing any one of said solenoids to move the corresponding pawl into operative position, and means for clearing said electrical selecting means so as to de-energize the selected solenoid.

12. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, means for urging the shifter bar towards its normal forward position, a series of clutch-actuating pawls corresponding to said gear-clutches, pivotally mounted on said shifter bar, means for holding said pawls in inoperative position, individual solenoids for each of said pawls located on said shifter bar, electrical selecting means for energizing any of said solenoids to move the corresponding pawl into operative position, means whereby only one of said solenoids may be energized at a time, and means for clearing said selecting means so as to de-energize the selected solenoid.

13. In a device of the character described, the combination with a shaft-clutch actuating member and a constant-mesh gear set including a series of gear-clutches and actuating means therefor operating in connection with certain of the gears of said set, said gears and clutches being located within a housing, of a shifter bar mounted for reciprocation on said housing, operative connections between said actuating member and said bar to cause movement of the bar rearwardly upon the operation of said actuating member, operating levers for said gear-clutches projecting through and adapted to swing in slots in said housing, means for closing said slots around the ends of said shifter levers, actuating means carried by said shifter bar to move the several gear-clutches into engagement upon the forward movement of said bar, means for normally maintaining said clutches in disengaged position, and means for bringing a selected gear-clutch actuating means into operative position.

14. The combination in a device of the character described, of driving and driven shafts, a gear set for varying the speed of or reversing the driven shaft, a shaft-clutch actuating member, a member mounted for reciprocation forwardly and rearwardly by said shaft-clutch actuating member, actuating devices carried by said reciprocable member for effecting various driving connections of the gear set between said driving and driven shafts upon forward movement of said reciprocable member, means for moving any one of said actuating devices into operative position, and automatic means tending to maintain said actuating devices in a normal, inoperative position and tending to return them to said inoperative position from the operative position upon rearward movement of the reciprocable member.

In testimony whereof I have signed my name to this specification.

BERNARD J. RIEDMILLER.